US011851879B2

(12) United States Patent
Coad

(10) Patent No.: US 11,851,879 B2
(45) Date of Patent: Dec. 26, 2023

(54) REINFORCED STRUCTURAL COMPONENT FOR RESISTING TENSILE LOADING AND PROVIDING IMPACT RESISTANCE

(71) Applicant: The Boeing Company, Chicago, IL (US)

(72) Inventor: Dennis L Coad, Madison, AL (US)

(73) Assignee: The Boeing Company, Chicago, IL (US)

( * ) Notice: Subject to any disclaimer, the term of this patent is extended or adjusted under 35 U.S.C. 154(b) by 42 days.

(21) Appl. No.: 17/490,566

(22) Filed: Sep. 30, 2021

(65) Prior Publication Data

US 2022/0243471 A1 Aug. 4, 2022

Related U.S. Application Data

(60) Provisional application No. 63/144,620, filed on Feb. 2, 2021.

(51) Int. Cl.
*E04C 3/29* (2006.01)
*F16L 9/12* (2006.01)

(52) U.S. Cl.
CPC ............... *E04C 3/29* (2013.01); *F16L 9/121* (2013.01)

(58) Field of Classification Search
CPC ...... E04C 3/29; E04C 3/28; E04C 2003/0452; E04C 3/36; E04C 2003/0413; E04C 5/07; E04C 2003/043; F16L 19/121
See application file for complete search history.

(56) References Cited

U.S. PATENT DOCUMENTS 5,097,870 A * 3/1992 Williams ............... E21B 17/206
138/144
5,176,180 A * 1/1993 Williams ............... F16L 11/127
138/132

(Continued)

FOREIGN PATENT DOCUMENTS

WO WO-0102662 A2 * 1/2001 .......... E01F 15/0461

OTHER PUBLICATIONS

Eck, Curtis, Wood I-Joist Do's and Don'ts, JLC, New England Edition, Sep. 1995.

(Continued)

*Primary Examiner* — Theodore V Adamos
(74) *Attorney, Agent, or Firm* — Quinn IP Law

(57) ABSTRACT

A reinforced structural component includes a body portion made of a combination of plastic material and chopped fibers. The body portion has a central longitudinal axis and a cross-section orthogonal to the central longitudinal axis, with the cross-section having an outer periphery and an inner core inward of the outer periphery. The body portion has an outer peripheral portion and an inner core portion corresponding to respective longitudinal projections of the outer periphery and inner core. The body portion is configured for being acted upon by a combination of forces causing tension within one or more longitudinal segments of the inner core portion. The reinforced structural component also includes one or more layers of continuous fiber disposed longitudinally within the one or more longitudinal segments, so as to resist tension caused within the one or more longitudinal segments.

20 Claims, 9 Drawing Sheets

(56) References Cited

U.S. PATENT DOCUMENTS

| | | | | |
|---|---|---|---|---|
| 5,194,111 | A | * | 3/1993 | Meatto .................... B29C 70/20 428/162 |
| 7,241,484 | B2 | * | 7/2007 | Van Dijk ................ B29C 48/05 428/105 |
| 2002/0110680 | A1 | * | 8/2002 | Bank ......................... E04C 5/07 428/297.4 |
| 2004/0009338 | A1 | * | 1/2004 | Jo .......................... B29C 70/506 428/297.4 |
| 2006/0283133 | A1 | * | 12/2006 | Westre ...................... E04C 3/29 52/837 |
| 2008/0003427 | A1 | * | 1/2008 | Van Dijk ................ E04F 13/18 428/358 |
| 2011/0204611 | A1 | * | 8/2011 | Ziegler ................ B62D 29/004 156/60 |
| 2013/0312346 | A1 | * | 11/2013 | To ............................ E04C 3/28 52/837 |
| 2015/0096244 | A1 | * | 4/2015 | Richards ................... E04C 3/02 52/843 |

OTHER PUBLICATIONS

Izydorek, Mark S., Report on Structural Stability of Engineered Lumber in Fire Conditions, Underwriters Laboratories, Sep. 30, 2008, pp. 1-178.

\* cited by examiner

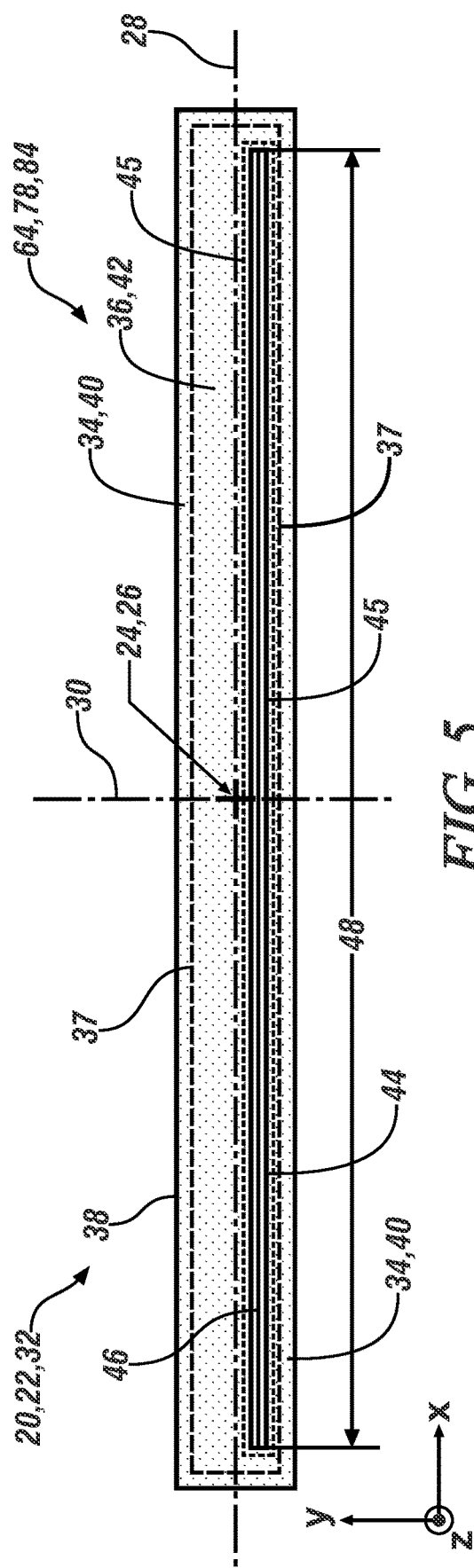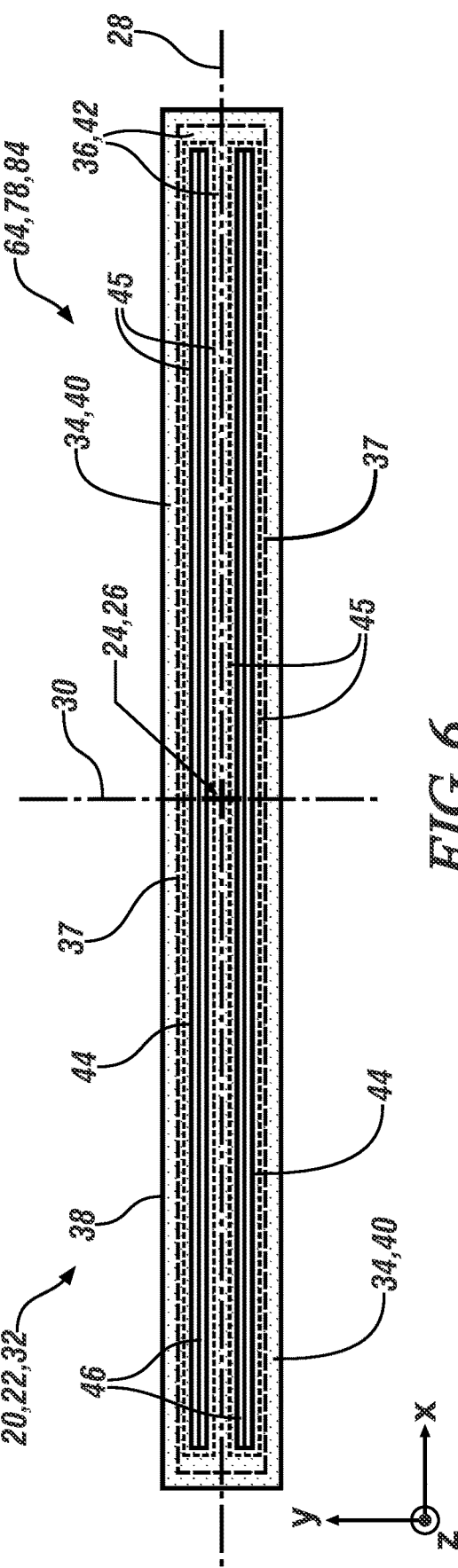

REINFORCED STRUCTURAL COMPONENT FOR RESISTING TENSILE LOADING AND PROVIDING IMPACT RESISTANCE

CROSS-REFERENCE RELATED APPLICATION

The present application claims priority to, and the benefit of, U.S. Provisional Patent Application No. 63/144,620 filed on Feb. 2, 2021, the entire disclosure of which is incorporated by reference herein.

INTRODUCTION

This disclosure relates to reinforced structural components for resisting tensile loading and providing impact resistance.

Structural members, including elongate structural members such as beams, may assume various forms and configurations depending upon the expected loading of forces thereon during the structural member's intended duty cycle. This may include the use of various geometric profiles, such as I-beams, channels, tubes and the like, as well as various sizes and dimensions for these geometric profiles. Additionally, various materials may be selected for use in structural members. Materials such as steel, aluminum, titanium and carbon fiber may offer certain capabilities to withstand or mitigate the effects of loads placed on a structural member, but sometimes these capabilities come with added weight or cost.

SUMMARY

According to one embodiment, a reinforced structural component includes a body portion made of a combination of plastic material and chopped fibers. The body portion has a central longitudinal axis and a cross-section orthogonal to the central longitudinal axis, with the cross-section having an outer periphery and an inner core inward of the outer periphery. The body portion has an outer peripheral portion and an inner core portion corresponding to longitudinal projections of the outer periphery and inner core, respectively, wherein the body portion is configured for being acted upon by a combination of forces causing tension within one or more longitudinal segments of the inner core portion. The reinforced structural component further includes one or more layers of continuous fiber disposed longitudinally within the one or more longitudinal segments so as to resist the tension caused within the one or more longitudinal segments.

The body portion may be configured for bending about a second axis transverse to the central longitudinal axis, wherein a width of each of the one or more layers of continuous fiber is disposed generally parallel with the second axis. The plastic material may be a thermoplastic material made of at least one of polyethylene, polypropylene, polystyrene, acrylonitrile-butadiene-styrene, polyvinyl chloride, fluoropolymer, polyamide, polycarbonate and polybenzimidazole; alternatively, the plastic material may be a thermoset material. The chopped fibers may be made of at least one of carbon, glass, aramid, polyacrylonitrile, graphene, boron, high-modulus polyethylene, and poly p-phenylene-2,6-benzobisoxazole, and the continuous fibers may be made of at least one of carbon fiber, fiberglass, aramid, polyacrylonitrile and graphene.

The cross-section may have a hollow profile defining a longitudinal cavity within the body portion. In this configuration, the cross-section may have an inner periphery adjacent the longitudinal cavity such that the inner core separates the inner and outer peripheries from each other. For example, in this configuration the body portion may be shaped as at least one of a single-channel pipe, a multi-channel pipe, a circular pipe and a polygonal pipe. Alternatively, the cross-section may have a solid non-hollow profile, wherein the body portion may be shaped, for example, as a rectangular beam, a circular beam, a triangular beam, an I-beam, a C-channel, an L-channel, a T-channel, a flat panel, or a curved panel. In either configuration, the body portion may be shaped as an extrusion of the cross-section along the central longitudinal axis, and in some arrangements the cross-section may vary in size and/or shape along the central longitudinal axis. The reinforced structural component may be produced by at least one of compression molding, extrusion molding, automated fiber placement, autoclave consolidation, thermoplastic welding and manual lay-up.

According to another embodiment, a reinforced structural component includes an elongate body portion made of thermoplastic material and chopped fibers. The elongate body portion has a central longitudinal axis and a cross-section orthogonal to the central longitudinal axis, with the cross-section having an outer periphery and an inner core inward of the outer periphery. The elongate body portion has an outer peripheral portion and an inner core portion corresponding to respective longitudinal projections of the outer periphery and inner core, wherein the elongate body portion is configured for bending about a second axis transverse to the central longitudinal axis causing tension in the longitudinal direction within one or more longitudinal segments of the inner core portion. The reinforced structural component further includes one or more layers of continuous fiber arrayed longitudinally within the one or more longitudinal segments so as to provide resistance against the tension caused within the one or more longitudinal segments.

A width of each of the one or more layers of continuous fiber may be disposed generally parallel with the second axis, and the cross-section may vary in size and/or shape along the longitudinal direction. The elongate body portion may be shaped as at least one of a single-channel pipe, a multi-channel pipe, a circular pipe, a polygonal pipe, a rectangular beam, a circular beam, a triangular beam, an I-beam, a C-channel, an L-channel, a T-channel, a flat panel, or a curved panel.

According to yet another embodiment, a structural component for an aircraft includes: (i) an elongate body portion made of thermoplastic material and chopped fibers, the elongate body portion having a central longitudinal axis and a cross-section orthogonal to the central longitudinal axis, the cross-section having an outer periphery and an inner core inward of the outer periphery, wherein the elongate body portion has an outer peripheral portion and an inner core portion corresponding to respective longitudinal projections of the outer periphery and inner core, and wherein the elongate body portion is configured for bending about a second axis transverse to the central longitudinal axis causing tension in the longitudinal direction within one or more longitudinal segments of the inner core portion; and (ii) one or more layers of continuous fiber arrayed longitudinally within the one or more longitudinal segments so as to provide resistance against the tension caused within the one or more longitudinal segments, wherein a width of each of the one or more layers of continuous fiber is disposed generally parallel with the second axis. In this arrangement, the cross-section may vary in size and/or shape along the longitudinal direction, and the elongate body portion may be shaped as at least one of a single-channel pipe, a multichannel pipe, a circular pipe, a polygonal pipe, a rectangular beam, a circular beam, a triangular beam, an I-beam, a C-channel, an L-channel, a T-channel, a flat panel, or a curved panel.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIGS. 5-6 are schematic cross-sectional views of two embodiments of a reinforced structural component shaped as a flat panel.

DETAILED DESCRIPTION

Figure 1:
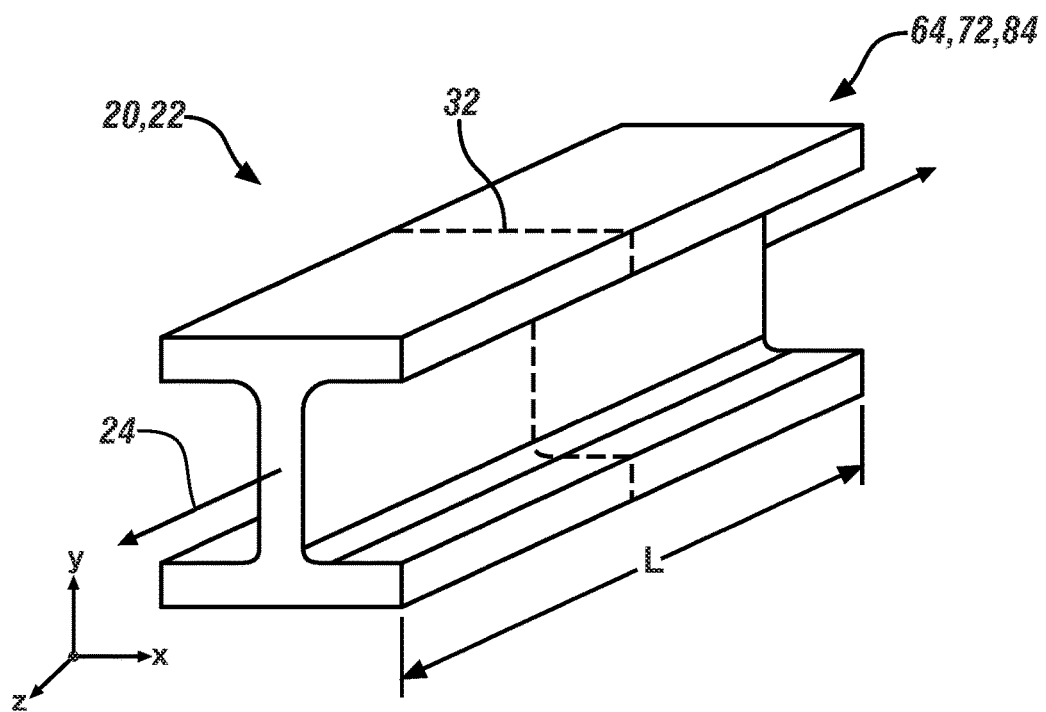
FIG. 1 is a schematic perspective view of a reinforced structural component having a solid profile.

Referring now to the drawings, wherein like numerals indicate like parts in the several views, various embodiments of a reinforced structural component 20 are shown and described herein. Each embodiment of the reinforced structural component 20 is effective for resisting tensile loading (i.e., tension), while also providing impact resistance.

Figure 2:
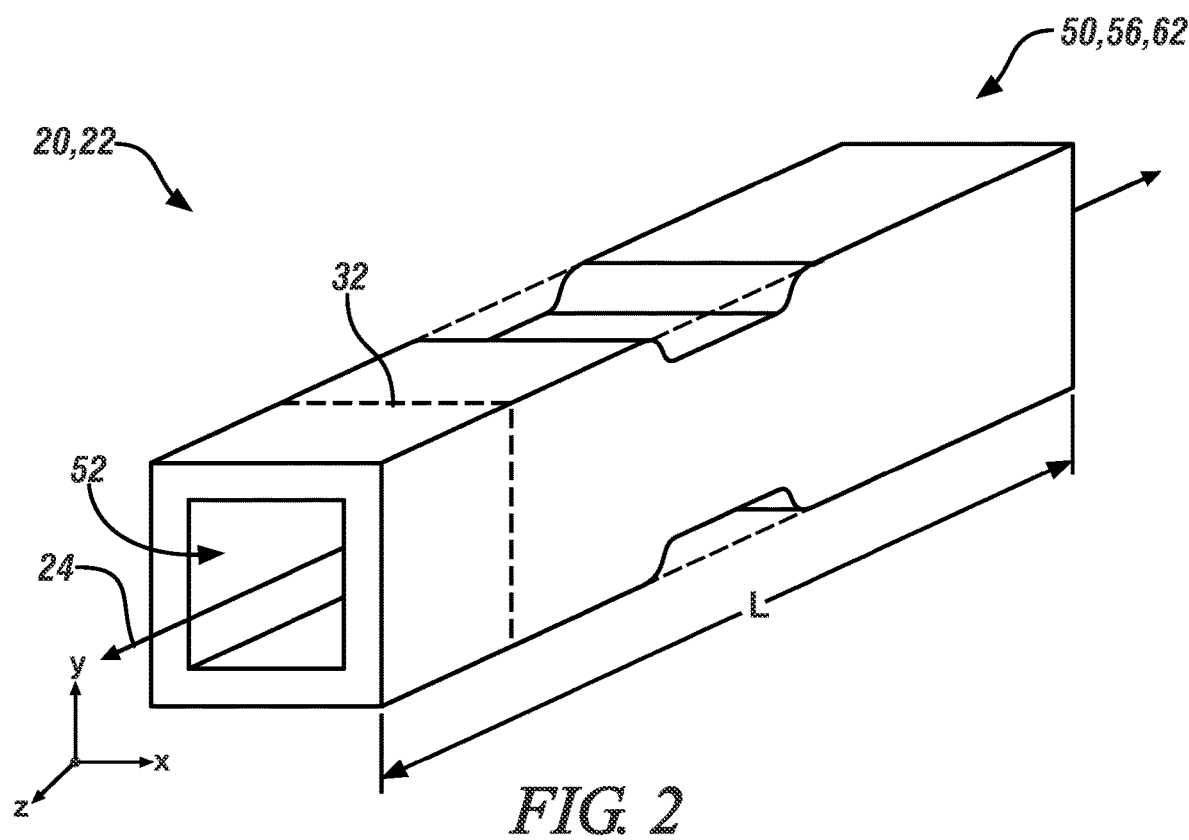
FIG. 2 is a schematic perspective view of a reinforced structural component having a hollow profile.

FIGS. 1-2 show schematic perspective views of two exemplary embodiments of the reinforced structural component 20. FIG. 1 shows a reinforced structural component 20 having a solid profile 64, while FIG. 2 shows a reinforced structural component 20 having a hollow profile 50 having a longitudinal cavity 52 extending along a central longitudinal axis 24. In these and other embodiments, the reinforced structural component 20 includes a body portion 22 made of a combination of plastic material and chopped fibers. The body portion 22 has a central longitudinal axis 24 (defining a longitudinal direction) and a cross-section 32 orthogonal to the central longitudinal axis 24. The cross-section 32 is represented by dashed lines in FIGS. 1-2.

FIGS. 3-6 and 11-21 show schematic cross-sectional views of various embodiments of the reinforced structural component 20. In each embodiment, the cross-section 32 has an outer periphery 34 and an inner core 36 inward of the outer periphery 34. (By "inward", it is meant that the inner core 36 is disposed more toward the central longitudinal axis 24 than is the outer periphery 32. In solid profiles 64, the central longitudinal axis 24 extends through the inner core 36, while in hollow profiles 50 the central longitudinal axis 24 extends either through the longitudinal cavity 52 or (in some multi-channel embodiments 58) through the divider portion 59.) The outer periphery 34 may extend between the outer perimeter 38 of the cross-section 32 and an arbitrary or nominal line or boundary 37 separating the outer periphery 34 from the inner core 36. Note that while reference numeral 37 is shown in the drawings as a distinct line or boundary, this is for illustration purposes only. The body portion 22 has an outer peripheral portion 40 and an inner core portion 42 corresponding to longitudinal projections of the outer periphery 34 and inner core 36, respectively.

Figure 7:
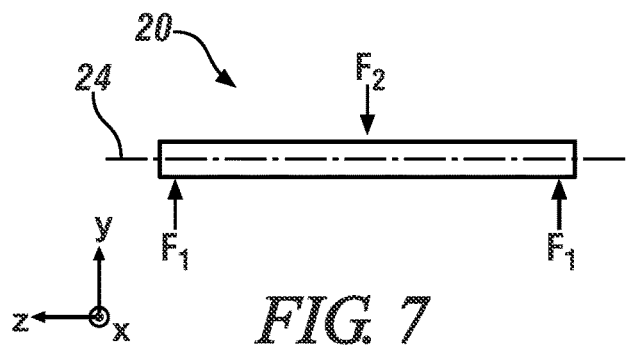
FIG. 7 is a schematic side view of a reinforced structural component shaped as a rectangular beam.
Figure 8:
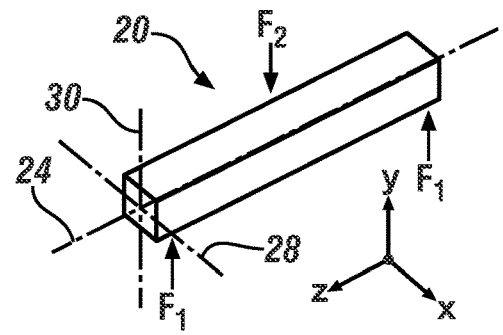
FIG. 8 is a schematic perspective view of the reinforced structural component of FIG. 7.
Figure 9:
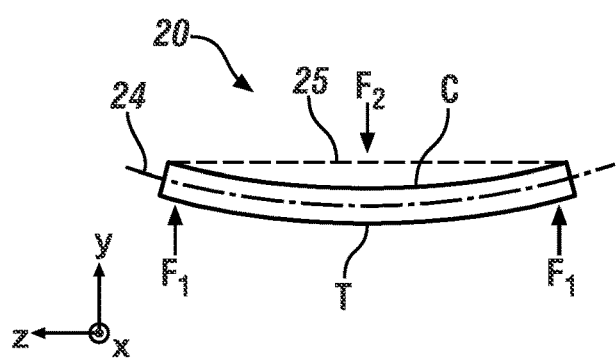
FIG. 9 is a schematic side view of the reinforced structural component of FIG. 7 subjected to forces causing tension and compression in the reinforced structural component.
Figure 10:
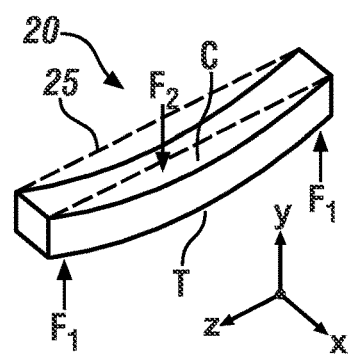
FIG. 10 is a schematic perspective view of the reinforced structural component of FIG. 9.

FIGS. 7-8 show schematic side and perspective views, respectively, of an exemplary reinforced structural component 20 shaped as a rectangular beam, and FIGS. 9-10 show schematic side and perspective views, respectively, of the rectangular beam being acted upon by a combination of forces. The forces illustrated here include two upward forces $F_1$ acting at or near the two ends of the reinforced structural component 20, and one downward force $F_2$ acting at or near the middle of the reinforced structural component 20 between the two ends. (Note that the drawings include conventional x, y and z coordinate axes for the sake of reference, with "upward" being along the positive y direction and "downward" being along the negative y direction. Using these coordinate axes, the central longitudinal axis 24 and longitudinal direction may lie along the z axis and direction. Also note that reference numeral 25, shown as dashed lines in FIGS. 9-10, indicates the top of the rectangular beam in the unstressed condition illustrated in FIGS. 7-8 before the application of the forces $F_1$, $F_2$.) The forces $F_1$, $F_2$ cause tension T and compression C in and/or along particular portions of the reinforced structural component 20. Note that while two upward forces $F_1$ and one downward force $F_2$ have been illustrated, other types and quantities of forces and constraints may act upon the reinforced structural component 20, including distributed loads and torques/moments. Each combination of forces causes various regions of the reinforced structural component 20 to experience tension T or compression C.

Knowing the expected combination of forces that the reinforced structural component 20 may be subjected to as part of its normal duty cycle, the reinforced structural component 20 may be designed in such a way as to help withstand or mitigate the effects of tension T imposed upon the reinforced structural component 20. For example, the body portion 22 may be configured for being acted upon by a combination of forces causing tension T within one or more longitudinal segments 44 of the inner core portion 42. (In the drawings, reference numeral 45 is used to denote an outer boundary of each longitudinal segment 44. Note that while reference numeral 45 is shown in the drawings as a distinct line or boundary, this is for illustration purposes only.) For example, the body portion 22 may be shaped and sized to have a particular cross-section 32 that is optimal for withstanding and/or mitigating the tension T caused by various forces that may act upon the reinforced structural component 20 during its intended duty cycle. Additionally, the reinforced structural component 20 further includes one or more layers of continuous fiber 46 disposed longitudinally within the one or more longitudinal segments 44 so as to resist the tension T caused within the one or more longitudinal segments 44.

The plastic material may be a thermoplastic material or a thermoset material. For example, a thermoplastic material may be made of at least one of polyethylene, polypropylene, polystyrene, acrylonitrile-butadiene-styrene, polyvinyl chloride, fluoropolymer, polyamide, polycarbonate and polybenzimidazole. Alternatively, a thermoset material may be made of at least one of epoxy, polyester resin, polyurethane and phenolic. The chopped fibers may be distributed throughout the plastic material and may be made of at least one of carbon, glass, aramid, polyacrylonitrile, graphene, boron, high-modulus polyethylene, and poly p-phenylene-2,6-benzobisoxazole. The layers of continuous fiber 46 may be made of at least one of carbon fiber, fiberglass, aramid, polyacrylonitrile and graphene, and may take the form of unidirectional or multidirectional woven fabrics, tows, tapes, etc. The reinforced structural component 20 may be produced by at least one of compression molding, extrusion molding, automated fiber placement, autoclave consolidation, thermoplastic welding and manual lay-up. Holes, attachments and other features may be added to or removed from the reinforced structural component 20 during and/or after the production process.

While the layers of continuous fiber 46 disposed beneath the exposed surface of the reinforced structural component 20 (i.e., beneath or inward of the outer periphery 34, as viewed in cross-section 32), the plastic and chopped fiber present in the outer periphery 34 offer excellent impact resistance, while the judicious placement of the layers of continuous fiber 46 within the longitudinal segments 44 of the inner core portion 42 offers excellent resistance against tension T which may be caused by the loading of forces upon the reinforced structural component 20 during its duty cycle. It should be noted that while most of the layers of continuous fiber 46 may be disposed beneath the surface of the reinforced structural component 20, some of the layers 46 may be exposed to or protrude through this surface. Also, while the chopped fibers may be generally dispersed within the plastic material, some of the plastic material may infiltrate the layers of continuous fiber 46, which may aid in bonding the individual layers 46 to each other and to the overall plastic/chopped fiber matrix or mixture.

Figure 3:
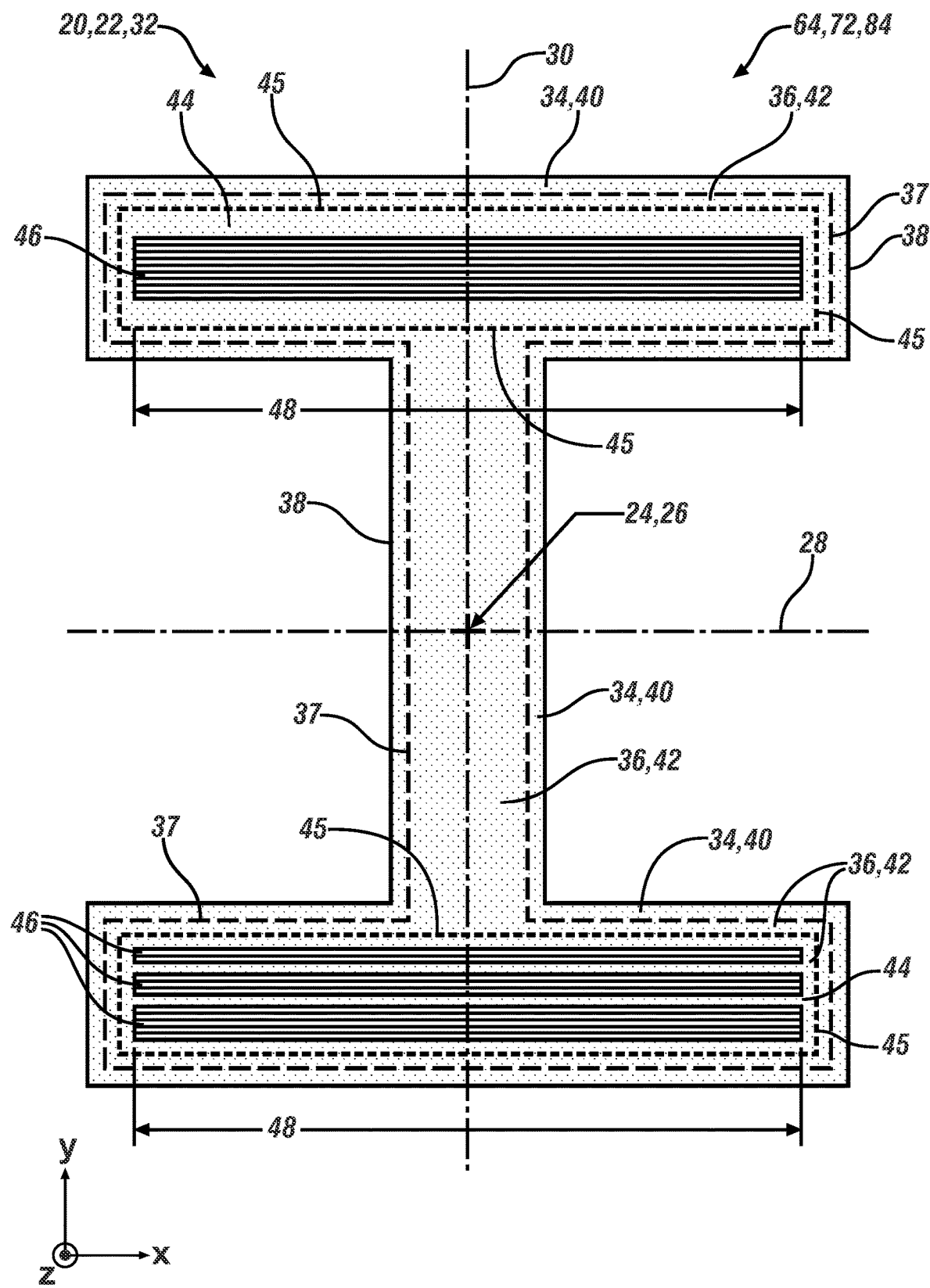
FIGS. 3-4 are schematic cross-sectional views of two embodiments of a reinforced structural component shaped as an I-beam.

The body portion 22 may be configured for bending about a second axis 28 transverse to the central longitudinal axis 24, wherein a width 48 of each of the one or more layers of continuous fiber 46 is disposed generally parallel with the second axis 28. For example, FIG. 3 shows a solid I-beam configuration 64, 72 of the reinforced structural component 20. The central longitudinal axis 24 is shown as a point at the centroid 26, because the view of the drawing is along the longitudinal direction or z axis. At the centroid 26, a second axis 28 is shown, which is transverse to the central longitudinal axis 24 and parallel with the x axis. Also shown at the centroid 26 is a third axis 30, which is likewise transverse to the central longitudinal axis 24, but is parallel with the y axis. This solid I-beam configuration 64, 72 is well suited to withstand bending about the second or x axis 28, due to the layers of continuous fiber 46 being positioned within the inner core portion 42 with their width 48 extending parallel with the second axis 28. Note that the layers of continuous fiber 46 are not only within the inner core portion 42, but are disposed at particular locations within the inner core portion 42; specifically, they are disposed within the two "horizontal" portions of the I-beam profile 72, and not within the "vertical" web portion. ("Horizontal" and "vertical" are used here to describe the orientations as viewed in FIG. 3.) In each of these two "horizontal" portions of the inner core portion 42, the layers of continuous fiber 46 are effective to help mitigate the effects of tension T caused by forces acting on the reinforced structural component 20.

Figure 11:
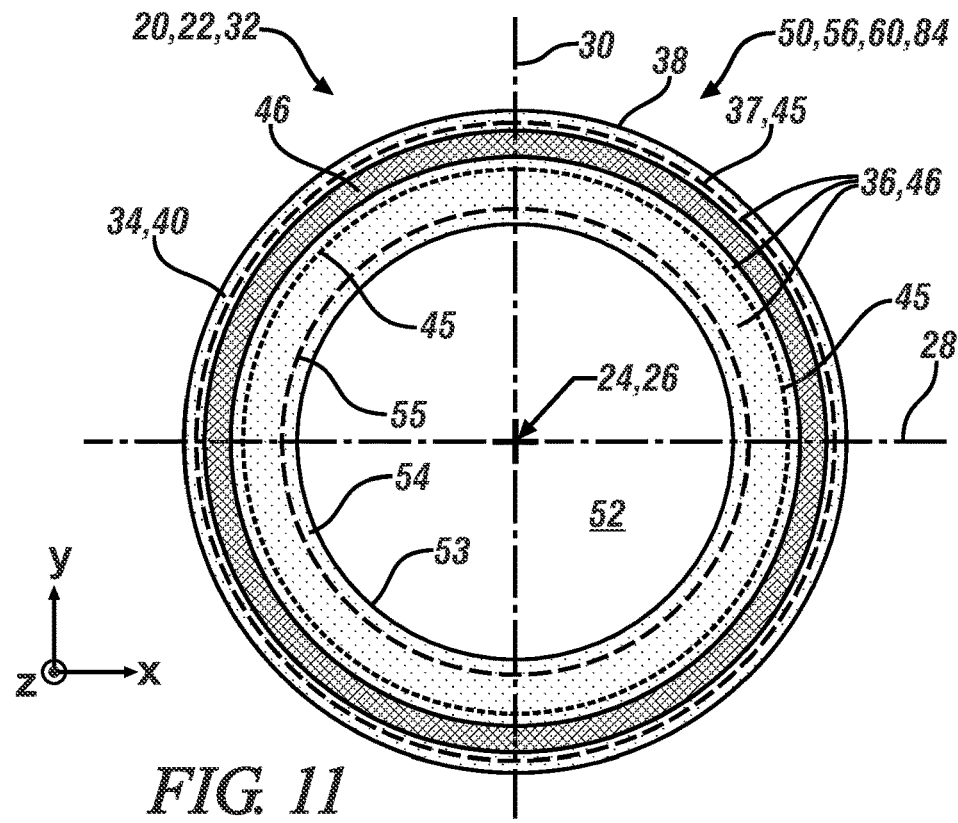
FIG. 11 is a schematic cross-sectional view of a reinforced structural component shaped as a single-channel circular pipe.
Figure 12:
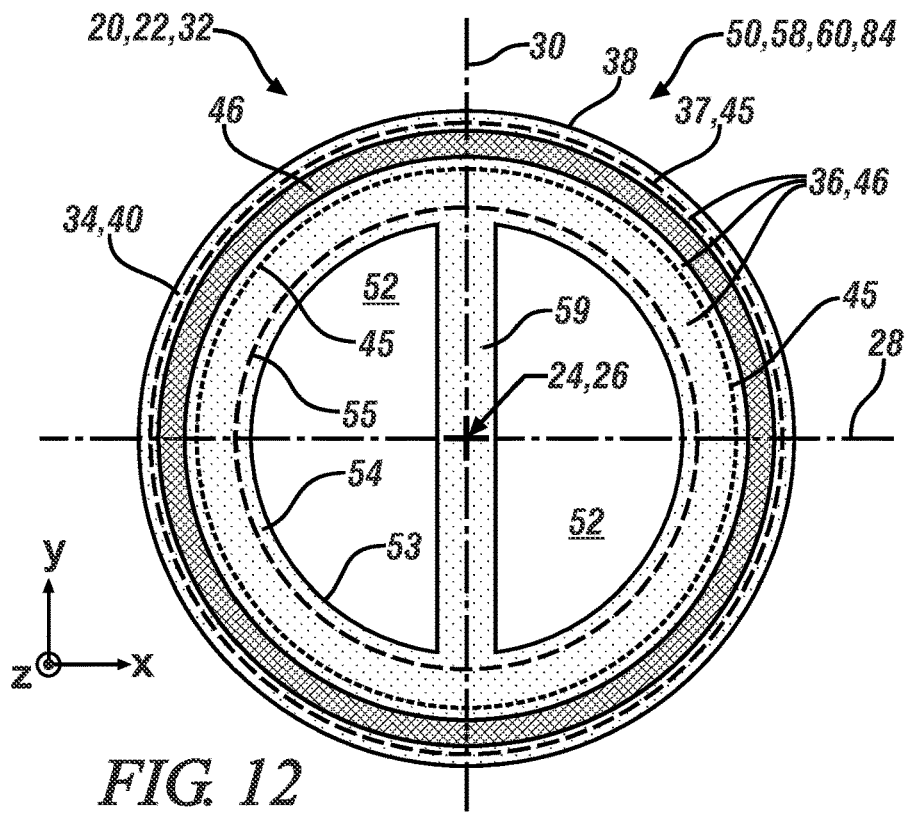
FIG. 12 is a schematic cross-sectional view of a reinforced structural component shaped as a multi-channel circular pipe.

As discussed above, the cross-section 32 of the reinforced structural component 20 may have a hollow profile 50 defining a longitudinal cavity 52 within the body portion 22. In this configuration, the cross-section 32 may have an inner periphery 54 adjacent the longitudinal cavity 52 such that the inner core 36 separates the inner and outer peripheries 54, 34 from each other. For example, in this configuration the body portion 22 may be shaped as at least one of a single-channel pipe 56 (FIGS. 2, 9 and 11-12), a multichannel pipe 58 (FIG. 10), a circular pipe 60 (FIGS. 9-10) and a polygonal pipe 62 (FIGS. 2 and 11-12). As illustrated in FIGS. 9-12, the inner periphery 54 may extend between an inner perimeter 53 and an arbitrary or nominal line or boundary 55 separating the inner periphery 54 from the inner core 36. Note that while reference numeral 55 is shown in the drawings as a distinct line or boundary, this is for illustration purposes only.

Figure 21:
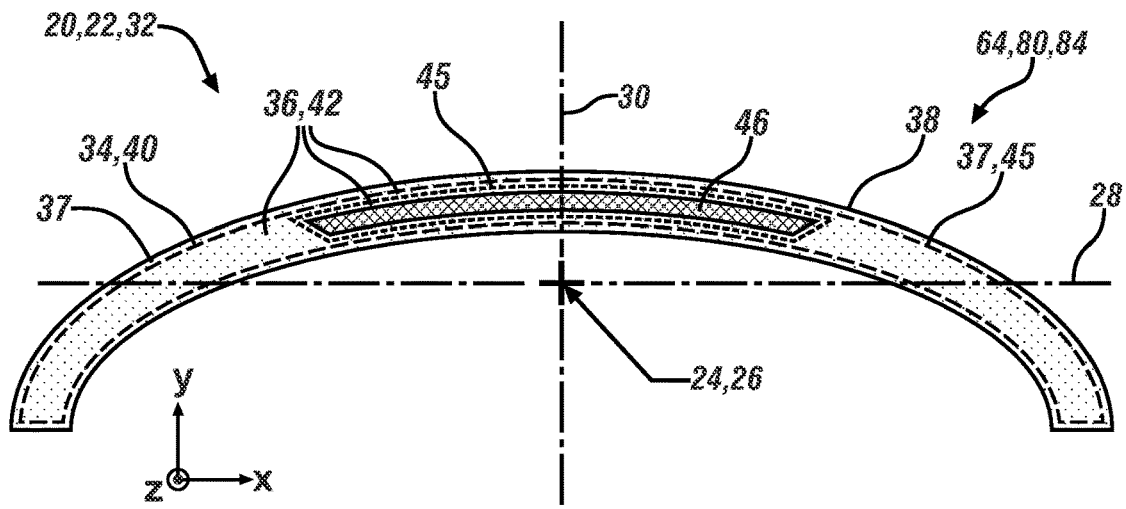
FIG. 21 is a schematic cross-sectional view of a reinforced structural component shaped as a curved panel.

Alternatively, and as also discussed above, the cross-section 32 of the reinforced structural component 20 may have a solid, non-hollow profile 64. In this configuration, the body portion 22 may be shaped, for example, as a rectangular beam 66 (FIGS. 7-10 and 14), a circular beam 68 (FIG. 15), a triangular beam 70 (FIG. 17), an I-beam 72 (FIGS. 1 and 3-4), a C-channel 74 (FIG. 18), an L-channel 76 (FIG. 19), a T-channel 77 (FIG. 20), a flat panel 78 (FIGS. 5-6), or a curved panel 80 (FIG. 21). In either of the hollow and solid configurations 50, 64, the body portion 22 may be shaped as an extrusion 84 of the cross-section 32 along the central longitudinal axis 24; in other words, the cross-section 32 maintains a constant size and shape along the length L of the reinforced structural component 20, as illustrated by the I-beam configuration 72 shown in FIG. 1. Alternatively, in some arrangements of the hollow and solid configurations 50, 64, the cross-section 32 may vary in size and/or shape along the central longitudinal axis 24 and length L of the reinforced structural component 20, such as the polygonal single-channel pipe configuration 56, 62 shown in FIG. 2.

Figure 4:
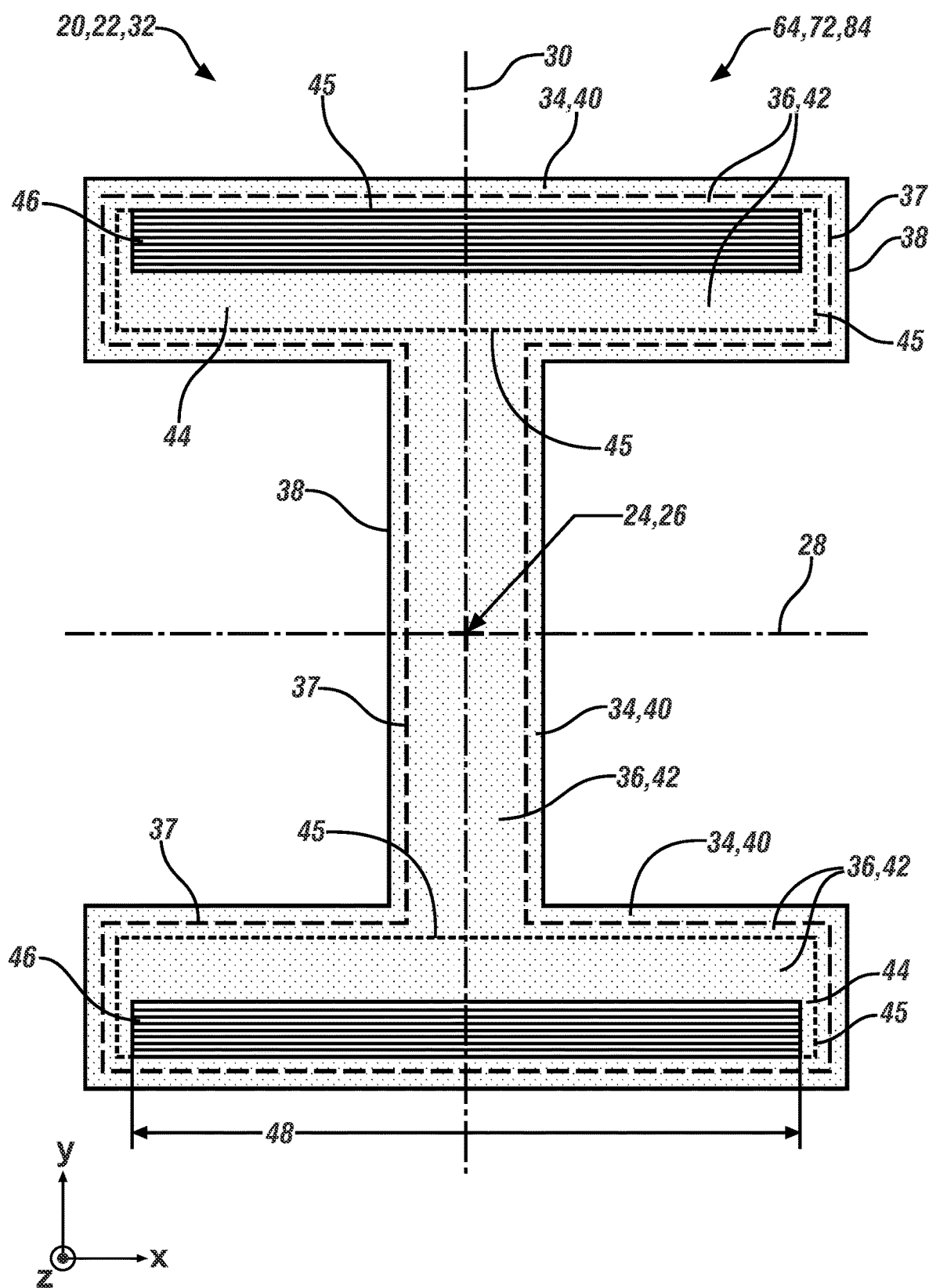
Figure 13:
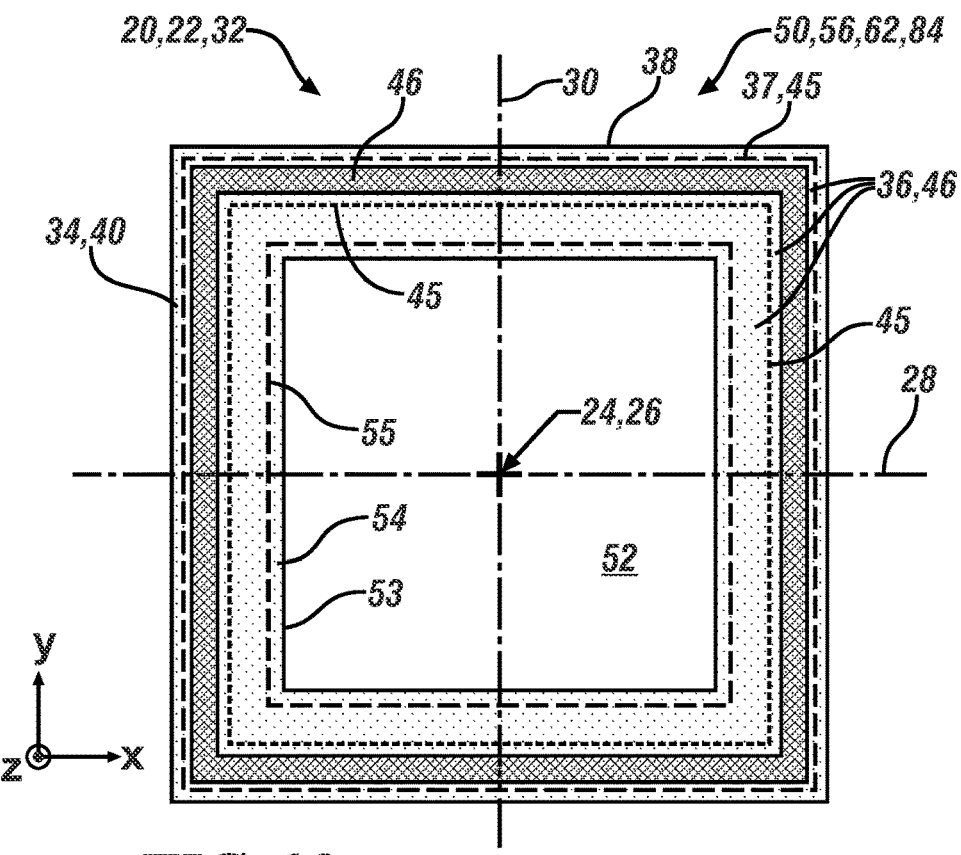
FIGS. 13-14 are schematic cross-sectional views of two embodiments of a reinforced structural component shaped as a single-channel polygonal pipe.
Figure 14:
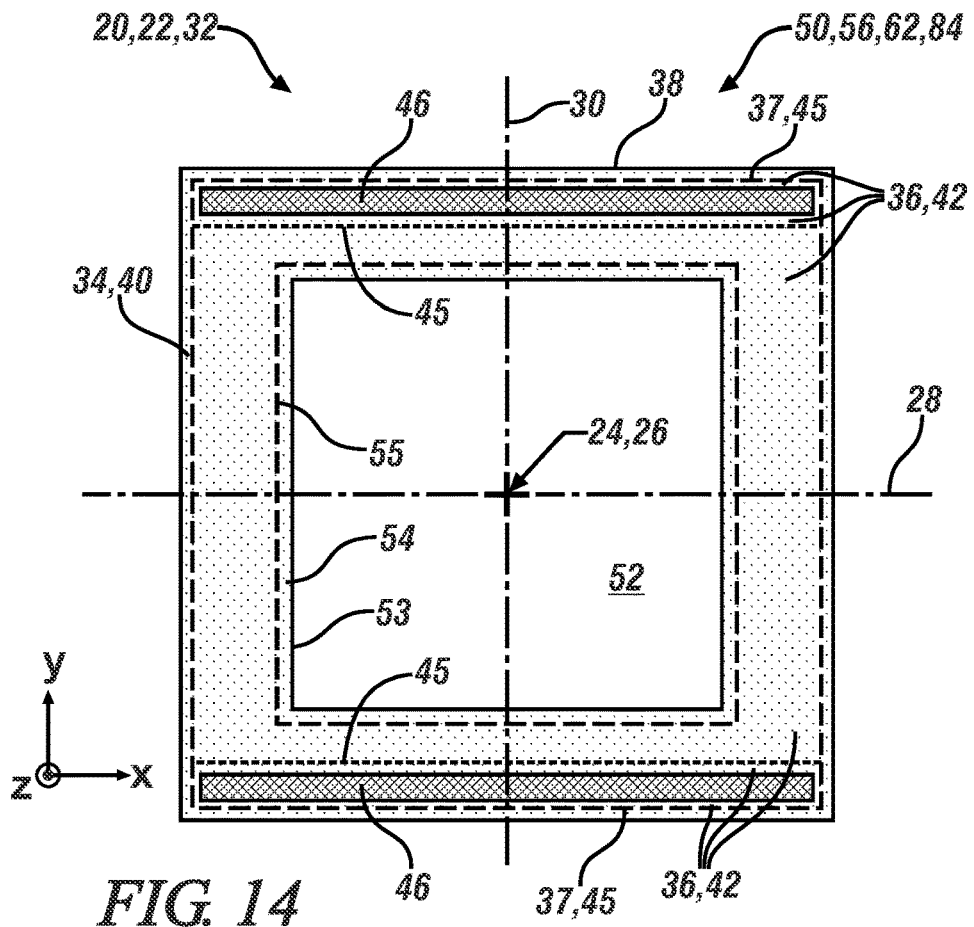
Figure 15:
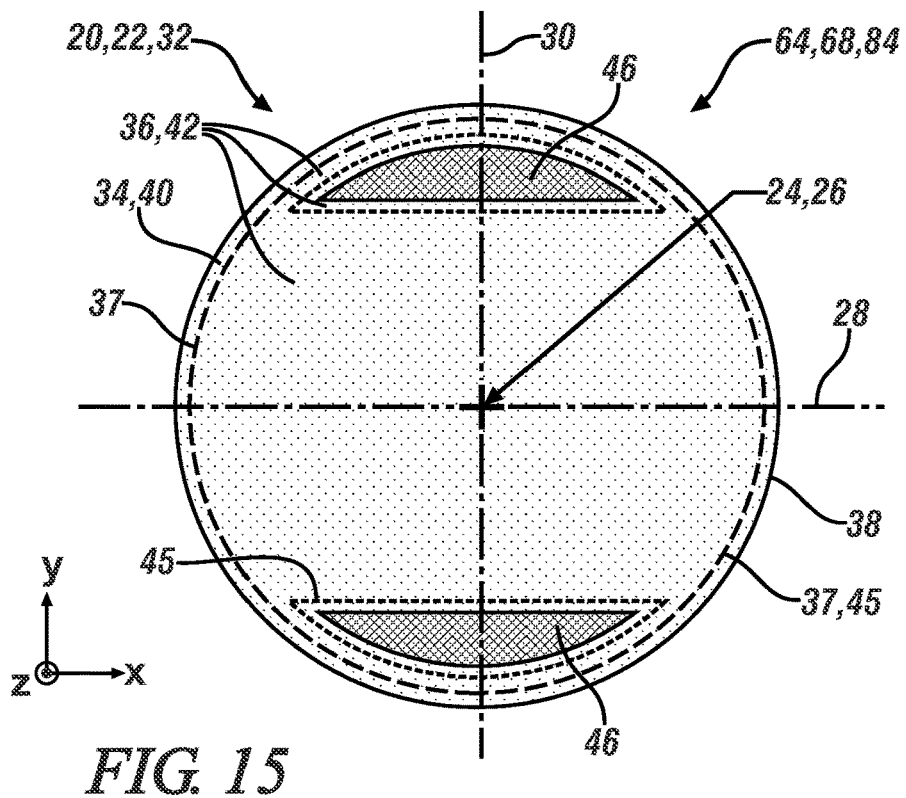
FIGS. 15-17 are schematic cross-sectional views of a reinforced structural component shaped as a circular beam, a rectangular beam and a triangular beam, respectively.
Figure 16:
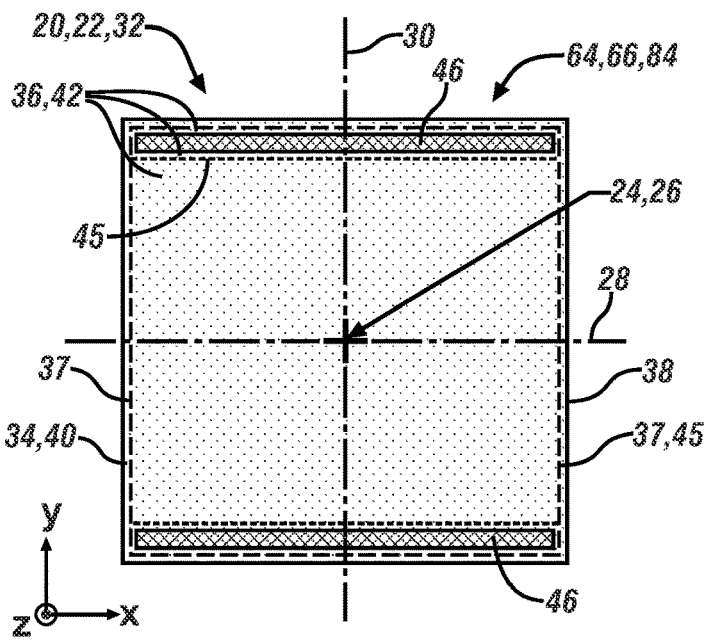
Figure 17:
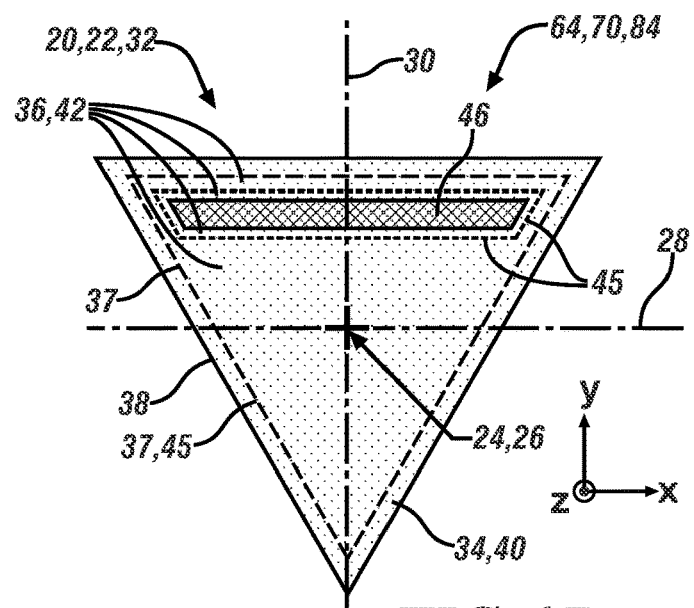
Figure 18:
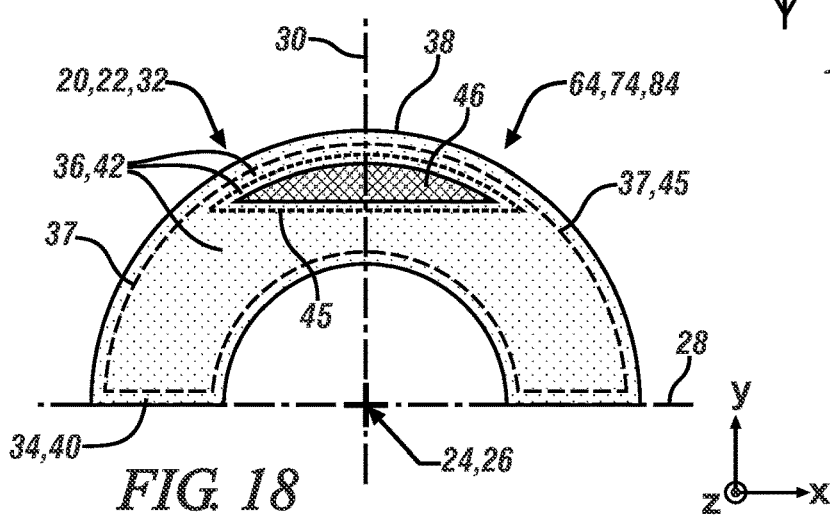
FIGS. 18-20 are schematic cross-sectional views of a reinforced structural component shaped as a C-channel, an L-channel and a T-channel, respectively.
Figure 19:
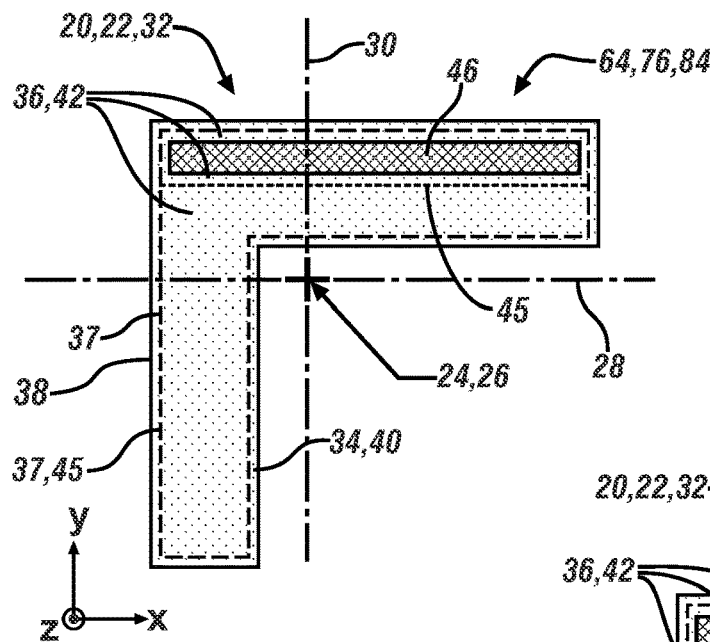
Figure 20:
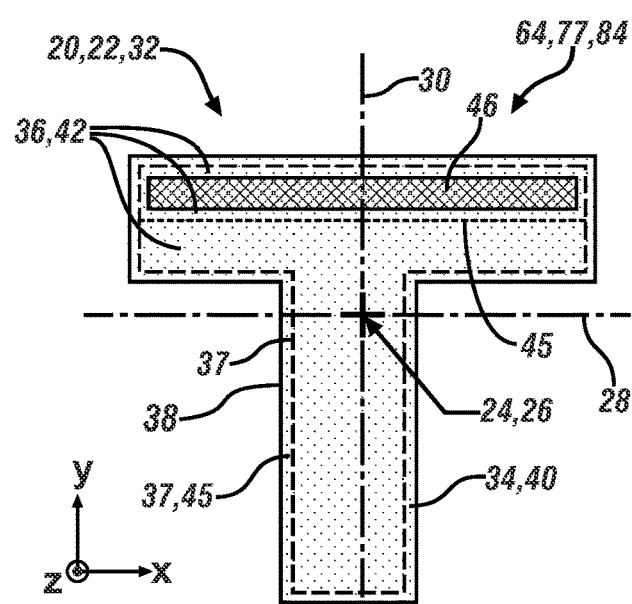

The drawings illustrate various ways some of these configurations may be rendered. For example, FIGS. 3-4 both show cross-sections 32 of an I-beam configuration or profile 72. Both drawings show layers of continuous fiber 46 in the two "horizontal" longitudinal segments 44 of the I-beam profile 72, but the arrangement of the layers of continuous fiber 46 within the longitudinal segments 44 is different. In FIG. 3, the layers 46 in the "top" longitudinal segment 44 are grouped into one bundle which is in the middle of the longitudinal segment 44, whereas the single bundle of layers 46 in each longitudinal segment 44 of FIG. 4 is not in the middle of its respective longitudinal segment 44. (In FIG. 4, the "top" bundle of layers 46 is disposed toward the top of the cross-section 32, while the "bottom" bundle of layers 46 is disposed toward the bottom of the cross-section 32. And in FIG. 3, the "top" longitudinal segment 44 includes a single bundle of layers 46 that is thicker than any of the three thinner bundles of layers 46 in the "bottom" longitudinal segment 44.) Similarly, FIGS. 5-6 both show flat panel configurations or profiles 78, with FIG. 5 only having one bundle of layers of continuous fiber 46 and FIG. 6 having two bundles. FIGS. 11-11 both show circular pipe configurations or profiles 60, with FIG. 11 being a single-channel pipe 56 and FIG. 12 being a multi-channel pipe 58 with a divider portion 59 separating the two longitudinal cavities or channels 52. FIGS. 13-14 both show polygonal (i.e., square) pipe configurations 62, with FIG. 13 having layers of continuous fiber 46 about the entire periphery of the cross-section 32, while FIG. 14 has the layers 46 only along two opposing sides of the cross-section 32. (Note that in FIGS. 11-13, the layers of continuous fiber 46 extend all the way around the cross-section 32, which may offer the ability to resist torsion about the central longitudinal axis 24 as well as resisting tension T.) Finally, FIGS. 17-21 have the layers of continuous fiber 46 only along one side of their respective cross-sections 32, while FIGS. 15-16 have the layers 46 along two opposing sides of their respective cross-sections 32. Thus, the embodiments shown in FIGS. 5 and 17-21 would be configured to oppose, withstand or mitigate tension T in one bending direction about the second axis 28; the embodiments shown in FIGS. 3-4, 6 and 14-16 would be configured to oppose, withstand or mitigate tension T in both bending directions about the second axis 28; and the embodiments shown in FIGS. 11-13 would be configured to oppose, withstand or mitigate tension T in both bending directions about the second axis 28, in both bending directions about the third axis 30, and in both bending directions about any other axis (not shown) that is transverse to the central longitudinal axis 24 (as well as offering torsional resistance about the central longitudinal axis 24).

According to another embodiment, a reinforced structural component 20 includes an elongate body portion 22 made of thermoplastic material and chopped fibers. The elongate body portion 22 has a central longitudinal axis 24 and a cross-section 32 orthogonal to the central longitudinal axis 24, with the cross-section 32 having an outer periphery 34 and an inner core 36 inward of the outer periphery 34. The elongate body portion 22 has an outer peripheral portion 40 and an inner core portion 42 corresponding to respective longitudinal projections of the outer periphery 34 and inner core 36, wherein the elongate body portion 22 is configured for bending about a second axis 28 transverse to the central longitudinal axis 24 causing tension T in the longitudinal direction within one or more longitudinal segments 44 of the inner core portion 42. The reinforced structural component 20 further includes one or more layers of continuous fiber 46 arrayed longitudinally within the one or more longitudinal segments 44 so as to provide resistance against the tension T caused within the one or more longitudinal segments 44.

In this embodiment, a width 48 of each of the one or more layers of continuous fiber 46 may be disposed generally parallel with the second axis 28, and the cross-section 32 may vary in size and/or shape along the longitudinal direction. The elongate body portion 22 may be shaped as at least one of a single-channel pipe 56, a multi-channel pipe 58, a circular pipe 60, a polygonal pipe 62, a rectangular beam 66, a circular beam 68, a triangular beam 70, an I-beam 72, a C-channel 74, an L-channel 76, a T-channel 77, a flat panel 78, or a curved panel 80.

In yet another embodiment, a structural component 20 for an aircraft includes: (i) an elongate body portion 22 made of thermoplastic material and chopped fibers, the elongate body portion 22 having a central longitudinal axis 24 and a cross-section 32 orthogonal to the central longitudinal axis 24, the cross-section 32 having an outer periphery 34 and an inner core 36 inward of the outer periphery 34, wherein the elongate body portion 22 has an outer peripheral portion 40 and an inner core portion 42 corresponding to respective longitudinal projections of the outer periphery 34 and inner core 36, and wherein the elongate body portion 22 is configured for bending about a second axis 28 transverse to the central longitudinal axis 24 causing tension T in the longitudinal direction within one or more longitudinal segments 44 of the inner core portion 42; and (ii) one or more layers of continuous fiber 46 arrayed longitudinally within the one or more longitudinal segments 44 so as to provide resistance against the tension T caused within the one or more longitudinal segments 44, wherein a width 48 of each of the one or more layers of continuous fiber 46 is disposed generally parallel with the second axis 28. In this arrangement, the cross-section 32 may vary in size and/or shape along the longitudinal direction, and the elongate body portion 22 may be shaped as at least one of a single-channel pipe 56, a multi-channel pipe 58, a circular pipe 60, a polygonal pipe 62, a rectangular beam 66, a circular beam 68, a triangular beam 70, an I-beam 72, a C-channel 74, an L-channel 76, a T-channel 77, a flat panel 78, or a curved panel 80.

The above description is intended to be illustrative, and not restrictive. While the dimensions and types of materials described herein are intended to be illustrative, they are by no means limiting and are exemplary embodiments. Note that the drawings have been presented in schematic form so as to generally represent the subject matter without attention to certain details which might otherwise be included in actual products; for example, while certain adjoining portions of the reinforced structural component 20 are illustrated as having sharp interior or exterior corners, a production part may utilize fillets and transitions instead. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A reinforced structural component, comprising:
a body portion made with a plastic material and chopped fibers distributed in the plastic material, the body portion having a central longitudinal axis and a cross-section orthogonal to the central longitudinal axis, the cross-section having an outer periphery and an inner core inward of the outer periphery, and the body portion having an outer peripheral portion and an inner core portion corresponding to longitudinal projections of the outer periphery and the inner core, respectively; and
one or more stacks of layers of continuous fibers disposed longitudinally within the body portion, embedded within the inner core portion, spaced inward of the outer periphery, and surrounded by the outer peripheral portion, wherein the continuous fibers are disposed longitudinally within the body portion.

2. The reinforced structural component according to claim 1, wherein the body portion is configured for bending about a second axis transverse to the central longitudinal axis, and wherein a width of each of the one or more layers of continuous fibers is disposed generally parallel with the second axis.

3. The reinforced structural component according to claim 1, wherein the plastic material is a thermoplastic material including polyethylene, polypropylene, polystyrene, acrylonitrile-butadiene-styrene, polyvinyl chloride, fluoropolymer, polyamide, polycarbonate, and/or polybenzimidazole.

4. The reinforced structural component according to claim 1, wherein the chopped fibers are made of carbon, glass, aramid, polyacrylonitrile, graphene, boron, high-modulus polyethylene, and/or poly p-phenylene-2,6-benzobisoxazole.

5. The reinforced structural component according to claim 1, wherein the continuous fibers are made of carbon fiber, fiberglass, aramid, polyacrylonitrile, and/or graphene.

6. The reinforced structural component according to claim 1, wherein the cross-section has a hollow profile defining a longitudinal cavity within the body portion.

7. The reinforced structural component according to claim 6, wherein the cross-section has an inner periphery adjacent the longitudinal cavity such that the inner core separates the inner and outer peripheries from each other.

8. The reinforced structural component according to claim 6, wherein the body portion is shaped as a single-channel pipe, a multi-channel pipe, a circular pipe, and/or a polygonal pipe.

9. The reinforced structural component according to claim 1, wherein the cross-section has a solid non-hollow profile.

10. The reinforced structural component according to claim 9, wherein the body portion is shaped as a rectangular beam, a circular beam, a triangular beam, an I-beam, a C-channel, an L-channel, a T-channel, a flat panel, or a curved panel.

11. The reinforced structural component according to claim 1, wherein the one or more stacks of layers of continuous fibers includes a first stack of the layers of continuous fibers disposed in a first section of the body portion and a second stack of the layers of continuous fibers disposed in a second section, spaced from the first section, of the body portion.

12. The reinforced structural component according to claim 1, wherein the cross-section varies in size and/or shape along the central longitudinal axis.

13. The reinforced structural component according to claim 1, wherein the reinforced structural component is produced by compression molding, extrusion molding, automated fiber placement, autoclave consolidation, thermoplastic welding, and/or manual lay-up.

14. A reinforced structural component, comprising:
an elongate body portion made of a thermoplastic material and chopped fibers distributed throughout the thermoplastic material, the elongate body portion having a central longitudinal axis and a cross-section orthogonal to the central longitudinal axis, the cross-section having an outer periphery and an inner core inward of the outer periphery, the elongate body portion having an outer peripheral portion and an inner core portion corresponding to respective longitudinal projections of the outer periphery and the inner core, wherein the elongate body portion is configured for bending about a second axis transverse to the central longitudinal axis causing tension in the longitudinal direction within one or more longitudinal segments of the inner core portion; and
a plurality of layers of continuous fibers stacked one on top of the other and bonded together in a stack of continuous fiber layers, the stack of continuous fiber layers arrayed longitudinally within the elongate body portion, embedded within the inner core portion, and spaced inward of the outer periphery, and surrounded by the outer peripheral portion of the elongate body portion, wherein all of the continuous fibers are disposed longitudinally within the body portion.

15. The reinforced structural component according to claim 14, wherein a width of each of the layers of continuous fibers is disposed generally parallel with the second axis.

16. The reinforced structural component according to claim 14, wherein the cross-section varies in size and/or shape along the longitudinal direction.

17. The reinforced structural component according to claim 14, wherein the elongate body portion is shaped as a single-channel pipe, a multi-channel pipe, a circular pipe, a polygonal pipe, a rectangular beam, a circular beam, a triangular beam, an I-beam, a C-channel, an L-channel, a T-channel, a flat panel, or a curved panel.

18. A structural component for an aircraft, comprising:
an elongate body portion made of a thermoplastic material and chopped fibers distributed throughout the thermoplastic material, the elongate body portion having a central longitudinal axis and a cross-section orthogonal to the central longitudinal axis, the cross-section having an outer periphery and an inner core inward of the outer periphery, the elongate body portion having an outer peripheral portion and an inner core portion corresponding to respective longitudinal projections of the outer periphery and inner core, wherein the elongate body portion is configured for bending about a second axis transverse to the central longitudinal axis causing tension in the longitudinal direction within one or more longitudinal segments of the inner core portion; and
a plurality of stacks of layers of continuous fibers arrayed longitudinally within the elongate body portion, embedded within the inner core portion, all spaced inward of the outer periphery, and surrounded by the outer peripheral portion, wherein an elongated width of each of the layers of continuous fibers extends transversely across the inner core portion and is disposed generally parallel with the second axis, and wherein the continuous fibers are disposed longitudinally within the body portion.

19. The structural component according to claim 18, wherein the cross-section varies in size and/or shape along the longitudinal direction.

20. The structural component according to claim 18, wherein the elongate body portion is shaped as a single-channel pipe, a multi-channel pipe, a circular pipe, a polygonal pipe, a rectangular beam, a circular beam, a triangular beam, an I-beam, a C-channel, an L-channel, a T-channel, a flat panel, or a curved panel.

* * * * *